(12) United States Patent
Kühn et al.

(10) Patent No.: US 12,731,799 B2
(45) Date of Patent: Sep. 8, 2026

(54) FUEL CELL STACK, FUEL CELL DEVICE AND FUEL CELL VEHICLE

(71) Applicants: VOLKSWAGEN AG, Wolfsburg (DE); kraftwerk ASSETS Inc., Wilmington, DE (US)

(72) Inventors: Sascha Kühn, Dresden (DE); Lutz Heinrich, Dresden (DE); Heiko Turner, Vechelde (DE); Dirk Jenssen, Braunschweig (DE); Christian Schlitzberger, Schönebeck (DE); Martin Buchenberger, Wendeburg (DE); Friedhelm Walkling, Braunschweig (DE); Florian Moll, Isenbüttel (DE); Steffen Wieland, Talheim (DE); Christin Zimmermann, Dresden (DE)

(73) Assignees: VOLKSWAGEN AG, Wolfsburg (DE); kraftwerk ASSETS Inc., Wilmington, DE (US)

( * ) Notice: Subject to any disclaimer, the term of this patent is extended or adjusted under 35 U.S.C. 154(b) by 610 days.

(21) Appl. No.: 18/001,809

(22) PCT Filed: Jul. 15, 2021

(86) PCT No.: PCT/EP2021/069773
§ 371 (c)(1),
(2) Date: Dec. 14, 2022

(87) PCT Pub. No.: WO2022/013359
PCT Pub. Date: Jan. 20, 2022

(65) Prior Publication Data

US 2023/0246207 A1 Aug. 3, 2023

(30) Foreign Application Priority Data

Jul. 17, 2020 (DE) ..................... 10 2020 119 021.2

(51) Int. Cl.
*H01M 8/04007* (2016.01)
*H01M 8/2404* (2016.01)
*H01M 8/248* (2016.01)

(52) U.S. Cl.
CPC ..... *H01M 8/04074* (2013.01); *H01M 8/2404* (2016.02); *H01M 8/248* (2013.01); *H01M 2250/20* (2013.01)

(58) Field of Classification Search
CPC .... B60L 50/70; B60L 50/72; H01M 2250/20; H01M 8/04074; H01M 8/2404;
(Continued)

(56) References Cited

U.S. PATENT DOCUMENTS

2005/0089736 A1 4/2005 Meyers et al.
2009/0226793 A1* 9/2009 Suh ....................... H01M 8/248 429/483

(Continued)

FOREIGN PATENT DOCUMENTS

CA 2674278 A1 * 7/2008 .......... H01M 8/2483
DE 102007002286 A1 7/2008

(Continued)

OTHER PUBLICATIONS

International Preliminary Report on Patentability, dated Oct. 18, 2022, for International Patent Application No. PCT/EP2021/069773. (6 pages).

(Continued)

*Primary Examiner* — Victoria H Lynch
(74) *Attorney, Agent, or Firm* — Seed Intellectual Property Law Group LLP

(57) ABSTRACT

A fuel cell stack comprises at least one fuel cell which is accommodated in a stack module box, a plurality of media channels, having media guides which are arranged on the outside of the stack module box and are in flow connection with the media channels, and a tensioning system which is guided around the stack module box and the tensioning device of which is guided around the media guides, which
(Continued)

are designed with a spring function. A related fuel cell device and a fuel cell vehicle are also provided.

9 Claims, 1 Drawing Sheet

(58) Field of Classification Search
CPC .. H01M 8/2475; H01M 8/248; H01M 8/2485; Y02E 60/50; Y02T 90/40
See application file for complete search history.

(56) References Cited

U.S. PATENT DOCUMENTS

| | | | | |
|---|---|---|---|---|
| 2011/0039180 | A1 | 2/2011 | Kading et al. | |
| 2021/0344032 | A1* | 11/2021 | Gretzer | H01M 8/2485 |

FOREIGN PATENT DOCUMENTS

| | | | |
|---|---|---|---|
| DE | 102018208981 | A1 | 12/2019 |
| DE | 102018219201 | A1 | 5/2020 |
| DE | 102020106091 | A1 | 9/2021 |
| EP | 2053676 | A1 | 4/2009 |
| JP | H0668884 | A | 3/1994 |
| KR | 20050070724 | A | 7/2005 |
| WO | WO 2021175553 | A1 | 9/2021 |

OTHER PUBLICATIONS

International Search Report, mailed Oct. 29, 2021, for International Patent Application No. PCT/EP2021/069773. (2 pages).

* cited by examiner

FUEL CELL STACK, FUEL CELL DEVICE AND FUEL CELL VEHICLE

BACKGROUND

Technical Field

Embodiments of the invention relate to a fuel cell stack having at least one fuel cell which is accommodated in a stack module box and comprises a plurality of media channels, having media guides which are arranged on the outside of the stack module box and are in flow communication with the media channels, and having a tensioning system which is guided around the stack module box and whose tensioning device is guided around the media guides which are designed with a spring function. Embodiments of the invention further relate to a fuel cell device as well as a fuel cell vehicle.

Description of the Related Art

Fuel cells are used to provide electrical energy from a chemical reaction between a hydrogen-containing fuel and an oxygen-containing oxidant, usually air.

In a solid oxide fuel cell (SOFC), an electrolyte layer thereby consists of a solid material from which the name is derived, for example, ceramic yttrium-doped zirconium dioxide, which is capable of conducting oxygen ions, whereas electrons are not conducted. The electrolyte layer is incorporated between two electrode layers, namely the cathode layer, which is supplied with the air, and the anode layer, which is supplied with the fuel, which may be formed by $H_2$, CO, $CH_4$ or similar hydrocarbons. When the air is fed through the cathode layer to the electrolyte layer, the oxygen takes up two electrons and the oxygen ions $O^{2-}$ that are formed move through the electrolyte layer to the anode layer, wherein the oxygen ions react with the fuel to form water and $CO_2$. On the cathode side, the following reaction takes place: $\frac{1}{2}O_2+2e^-\rightarrow 2O^{2-}$ (reduction/electron uptake). At the anode, the following reactions take place: $H_2+O^{2-}\rightarrow H_2O+2e^-$ as well as $CO+O^{2-}\rightarrow CO_2+2e^-$ (oxidation/electron release).

In a polymer electrolyte membrane fuel cell (PEM fuel cell), hydrogen nuclei are transported across the membrane instead of oxygen ions since an electrochemical oxidation of $H_2$ to $H^+$ takes place with the release of electrons $e^-$. Protons $H^+$ are transported across the membrane from the anode compartment to the cathode compartment. The electrons provided at the anode are fed to the cathode via an electrical line. Oxygen or an oxygen-containing gas mixture is supplied to the cathode, such that a reduction of $O_2$ to $O^{2-}$ takes place with the uptake of the electrons. At the same time, the oxygen anions in the cathode compartment react with the protons transported across the membrane to form water. At the anode, the following reaction takes place: $2H_2\rightarrow 4H^++4e^-$ (oxidation/electron release); on the cathode side, the following reaction takes place: $O_2+4H^++4e^-\rightarrow 2H_2O$ (reduction/electron uptake).

To increase the electrical power provided by a fuel cell device, it is possible to combine several fuel cells in a fuel cell stack, for which a sufficient supply of the reactants must be ensured, which reactants are fed to the fuel cell stack and within the fuel cell stack to the fuel cells by media guides.

This plurality of fuel cells combined in a fuel cell stack is generally tensioned using tension elements having a force in the range of several tons in order to achieve sufficient contact pressure at the membrane to reduce ohmic losses and using high compression to avoid leakage of the seals used.

It should be noted, however, that forces occur during operation of the fuel cell stack which can lead to an increase or reduction in the pressing force. The increase in pressing force is caused by thermal expansion of the components used, by the pressure used for feeding and distributing the reactants, wherein thermal expansion is particularly significant in solid oxide fuel cells due to the high temperatures, as is negative thermal expansion, which leads to a decreasing pressing force at falling or low temperatures.

In DE 10 2007 002 286 A1, a media supply plate is proposed that has connections for supply and discharge of media, wherein the fuel cell stack is stacked directly onto the media supply plate. The media supply plate further comprises an aperture for the passage of a fuel cell stack tensioning element. EP 2 053 676 A1 discloses the compression of a fuel cell stack by means of a pressing device. KR 20050070724 A describes a cylindrical fuel cell stack in which cylindrical channels are used to supply the anode and cathode.

BRIEF SUMMARY

Some embodiments provide a fuel cell stack having a compact construction. Some embodiments provide an improved fuel cell device and an improved fuel cell vehicle.

Some embodiments are characterized by the fact that leaks due to expansion of the fuel cell stack, in particular due to thermal expansion, are reliably prevented, wherein there is a compact design of the fuel cell stack in which separate spring assemblies can be dispensed with, which is to say there is also a reduced installation space requirement. The fuel cell stack can be operated under pressure, and there is an extension in function of the media guide as a distribution structure.

In so doing, there is the possibility that the spring function of at least one of the media guides is realized by forming it from a resilient material, which is to say a material that has elastic properties.

Alternatively or even additionally, there is the possibility that the spring function of at least one of the media guides is realized by its elastically compressible shape, which can, in particular, be realized by a bellows. However, other shapes are also possible.

The tensioning device may be designed as a tensioning band, but may also comprise threaded rods or other tension elements that apply mechanical tension.

The cross-sectional shape of the gas channels may be unchangeable under the action of the tensioning system in order to always be able to guarantee a sufficient cross-section for the passage of the media, wherein the side of the gas channels facing the tensioning device is rounded for improved interaction with the tensioning device.

The advantages and effects mentioned above also apply to a fuel cell device having a fuel cell stack of the type described above, as well as to a fuel cell vehicle with such a fuel cell device.

The features and combinations of features mentioned above in the description, as well as the features and combinations of features mentioned below in the description of figures and/or shown alone in the figures can be used not only in the respectively indicated combination, but rather also in other combinations or on their own. Thus, embodiments which are not explicitly shown or explained in the figures, but which arise from the elucidated embodiments and are producible by separate combinations of features, are also to be considered as encompassed and disclosed by the present disclosure.

BRIEF DESCRIPTION OF THE SEVERAL VIEWS OF THE DRAWINGS

Further advantages, features and details will be apparent from the claims, from the following description of embodiments as well as from the drawings.

DETAILED DESCRIPTION

A fuel cell device comprises a fuel cell stack 1 that has a plurality of fuel cells connected in series. The fuel cell device can, for example, be part of a fuel cell vehicle not shown in more detail.

Each of the fuel cells comprises an anode and a cathode, as well as an ion-conductive membrane separating the anode from the cathode. Fuel (for example, hydrogen) is supplied by means of an anode supply line via anode compartments within the fuel cell stack 1 to the anodes from a gas pressure reservoir. Cathode gas (for example, oxygen or oxygen-containing air) may be supplied to the cathodes by means of a cathode supply line via cathode compartments within the fuel cell stack 1. The fuel cell device may moreover comprise a coolant circuit for temperature control of the fuel cell stack 1.

The fuel, the cathode gas and, if necessary, the coolant must be fed into and discharged from the fuel cell stack 1, for which purpose media guides 2 are used.

Figure 1:
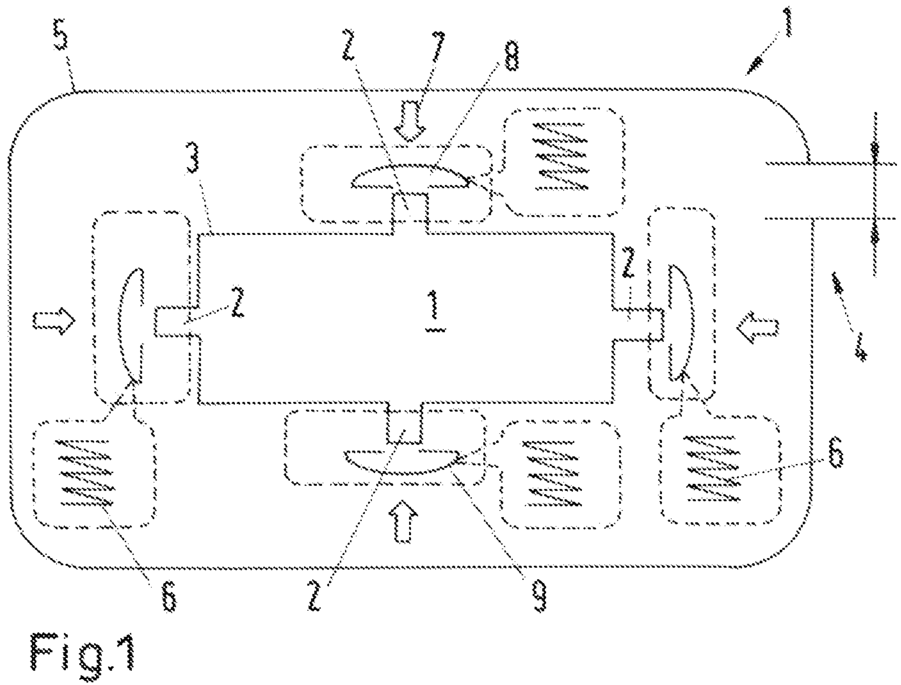
FIG. 1 shows a schematic representation of a cross-section through a stack module box, with the tensioning system exerting a tensioning force by means of a tensioning device.
Figure 2:
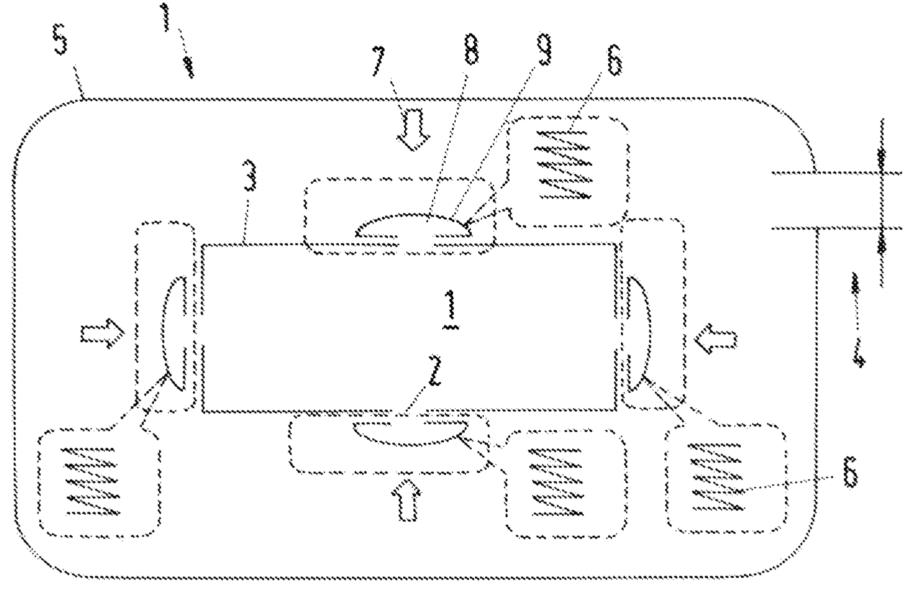
FIG. 2 shows a representation corresponding to FIG. 1 with an increased tensioning force compared to FIG. 1.

FIG. 1 shows a highly simplified cross-section of a fuel cell stack 1 having a fuel cell, which is not shown in detail, accommodated in a stack module box 3, which comprises several media channels that are in flow communication with the media guides 2 arranged on the outside of the stack module box 3. A tensioning system 4 is guided around the stack module box 3, the tensioning device 5 of which tensioning system surrounds the media guides 3, which are designed with a spring function, as indicated in FIGS. 1 and 2 by the spring symbols 6, which are assigned to the media guides 2.

In so doing, the spring function of at least one media guide 2 can be realized by its being made of a resilient material; alternatively or even additionally, it is possible that the spring function of at least one of the media guides 2 is realized by their elastically compressible shape, in particular, that at least one of the media guides 2 is shaped as a bellows.

FIG. 1 shows that the tensioning device 5 is designed as a tensioning band that is guided around the media guides 2 and exerts a force 7 on them. If, for example, the stack module box 3 expands due to an increase in temperature or pressure exerted on it, the tensioning force or the inward forces 7 exerted on the media guides 2 and symbolized by the arrow 7 increase, resulting in the situation shown in FIG. 2, in which the media guides 2 are resiliently pressed together. The media guides 2 thus replace a separate spring system or spring assembly while ensuring the same function.

According to an embodiment that is not shown, the tensioning device 5 may comprise threaded rods that can generate forces acting on all sides in cooperation with further struts. It should be noted that the cross-sectional shape of the gas channels 8 for the supply and discharge of the media, with respect to the stack module box 3 having its media guides 2 as distribution structure, is unchangeable under the action of the tensioning system 4 (FIG. 1 and FIG. 2). This ensures that the cross-section required for the pass-through of the media is always of the required size, wherein the side of the gas channel 8 facing the tensioning device 5 is rounded to enable better and more wear-friendly contact with the tensioning device 5.

German patent application no. 10 2020 119021.2, filed Jul. 17, 2020, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell stack, comprising:

a stack module box;

at least one fuel cell that is accommodated in the stack module box and includes a plurality of media channels;

a plurality of media guides that are arranged on an outside of the stack module box and are in flow connection with the plurality of media channels of the at least one fuel cell; and a tensioning system which is guided around the stack module box and a tensioning device of which is guided around the plurality of media guides to apply a tensioning force to the plurality of media guides, wherein the plurality of media guides are formed from a resilient material and are designed with a spring function such that the plurality of media guides deform and change shape in response to an increase or a decrease in the tensioning force applied to the plurality of media guides by the tensioning device arising from temperature changes during operation of the fuel cell stack.

2. The fuel cell stack according to claim 1, wherein the spring function of the plurality of media guides is realized by each media guide comprising an elastically compressible shape.

3. The fuel cell stack according to claim 2, wherein at least one of the plurality of media guides is shaped as a bellows.

4. The fuel cell stack according to claim 1, wherein the tensioning device is designed as a tensioning band.

5. The fuel cell stack according to claim 1, wherein the tensioning device comprises threaded rods.

6. The fuel cell stack according to claim 1, wherein gas channels associated with the plurality of media guides are unchangeable in cross-sectional shape under the action of the tensioning system.

7. The fuel cell stack according to claim 6, wherein a side of each gas channel facing the tensioning device is rounded.

8. A fuel cell device having a fuel cell stack according to claim 1.

9. A fuel cell vehicle having a fuel cell device according to claim 8.

* * * * *